United States Patent
Suga (10) Patent No.: US 7,830,562 B2
(45) Date of Patent: Nov. 9, 2010

(54) IMAGE INPUT DEVICE AND IMAGE INPUT METHOD

(75) Inventor: Junya Suga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 933 days.

(21) Appl. No.: 11/708,959

(22) Filed: Feb. 20, 2007

(65) Prior Publication Data

US 2007/0195379 A1     Aug. 23, 2007

(30) Foreign Application Priority Data

Feb. 21, 2006   (JP)  .................. 2006-043527

(51) Int. Cl.
     *H04N 1/04*      (2006.01)
(52) U.S. Cl. .................. 358/497; 358/473; 358/463; 358/496
(58) Field of Classification Search ................ 358/497, 358/473, 463, 496
See application file for complete search history.

(56) References Cited

FOREIGN PATENT DOCUMENTS

| | | |
|---|---|---|
| JP | 62-051869 | 3/1987 |
| JP | 11-004329 | 1/1999 |
| JP | 11-055471 | 2/1999 |

*Primary Examiner*—Houshang Safaipour
(74) *Attorney, Agent, or Firm*—Nutter McClennen & Fish LLP; John J. Penny, Jr.

(57) ABSTRACT

There is provided an image input device in which a carriage mounted with an image sensor and three types of light source is moved in a sub-scanning direction of a document by a motor and the document is read in a line sequential manner. The image input device includes a controller controlling a driving of the motor, an operation of the image sensor, and lighting and extinguishing operations of the light source; and a detecting unit outputting an edge signal to the controller when detecting a movement of the carriage corresponding to one sub-scanning line. The controller is configured to sequentially light and extinguish the three types of light source whenever receiving the edge signal from the detecting unit so as to sequentially read out electric charge stored in the image sensor during the lighting period of the respective light source; and discard the electric charge stored in the image sensor during an intervening period before receiving a subsequent edge signal.

4 Claims, 4 Drawing Sheets

IMAGE INPUT DEVICE AND IMAGE INPUT METHOD

BACKGROUND

The entire disclosure of Japanese Patent Application No. 2006-043527, filed Feb. 21, 2006 is expressly incorporated by reference herein.

1. Technical Field

The present invention relates to the field of an image input device.

2. Related Art

An example of a known image input device is that in which respective light beams from a light source of LEDs corresponding to each color of R (red), G (green), and B (blue) are irradiated on a document and light beams reflected from the document are photoelectrically converted by an image sensor, thereby electrically reading the document (see JP-A-11-055471, for example). Specifically, JP-A-11-055471 discloses a handheld-type image input device. The image input device is provided with an encoder detecting a movement amount of the document, and the encoder outputs an encoder pulse when detecting a predetermined movement amount. In the image input device, the LEDs corresponding to each color of R, G, and B are sequentially lighted and extinguished at the time of receiving the encoder pulse to read out data corresponding to one scanning line, and then the LEDs are extinguished until receiving a subsequent encoder pulse.

As the image input device using an image sensor, there is known a device in which a carriage mounted with an image sensor and LEDs of three colors R, G, and B is driven by a DC motor connected to an encoder so that feedback control is performed therebetween. In such a type of image input device, when the carriage is moved by an amount corresponding to one scanning line (in a sub-scanning direction) by the DC motor, the encoder outputs a signal. Then, the image input device outputs a shift signal SH in synchronization with receiving the signal from the encoder and starts an operation of reading reflected light beams of a first color corresponding to one sub-scanning line in response to the shift signal. Operations of reading reflected light beams of the remaining two colors are performed in response to a subsequent shift signal that is output with a predetermined time lapse after the previous shift signal used for the first color, by using a timer.

Figure 4:
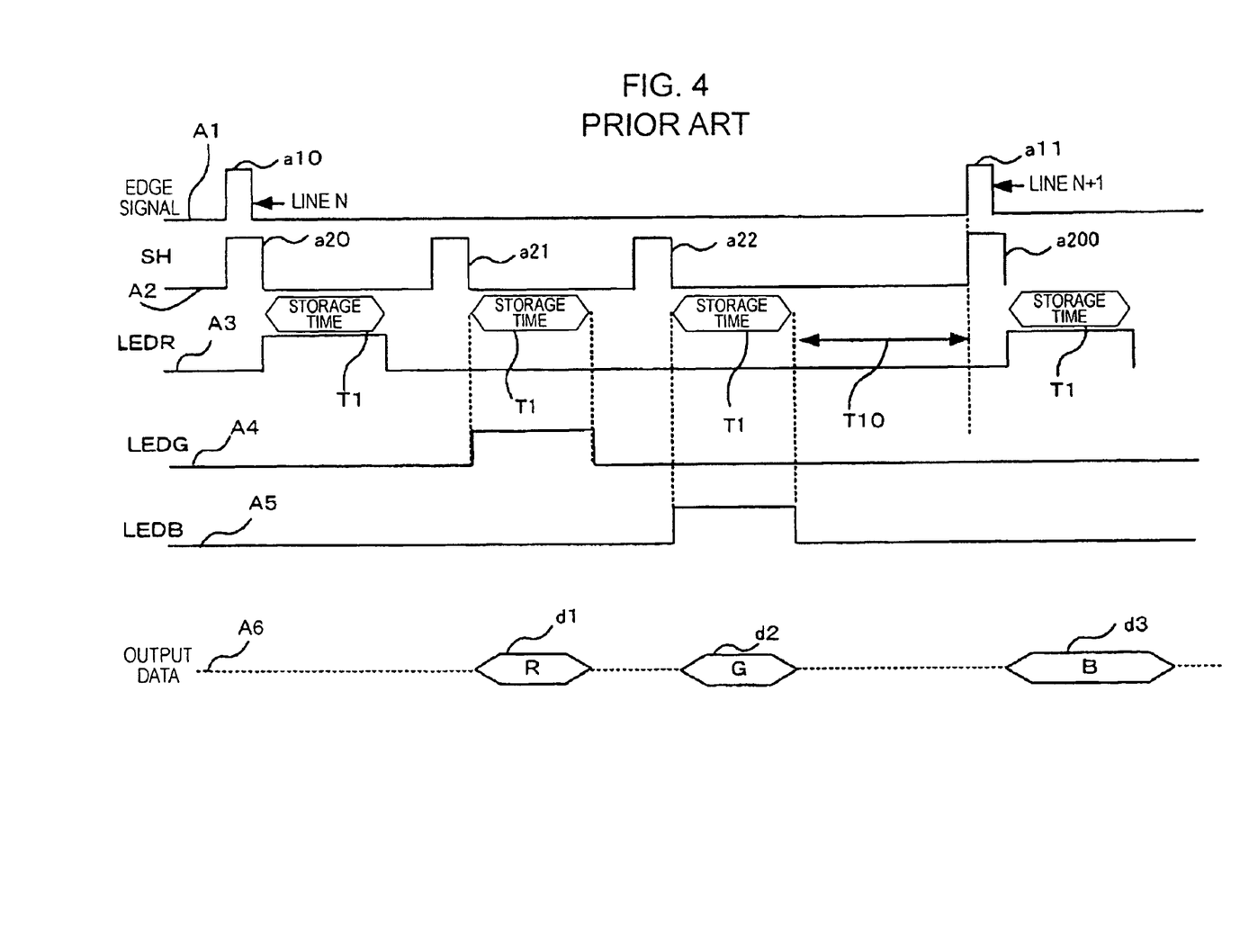
FIG. 4 is a diagram for explaining an operation of an image sensor reading out electric charge in accordance with the known art.

Here, an operation of the image sensor in the image input device in which data is read in accordance with the signal from the encoder will be described with reference to FIG. 4.

In the image input device, a shift signal SH a20 is output in synchronization with receiving an edge signal a10 from an encoder so as to light an LED of a first color (for example, an R color) of three colors R, G, and B in response to the shift signal a20 (A3) and extinguish the first-color LED after a predetermined storage time T1. The image sensor stores electric charge in its light-receiving element during the lighting period of the first-color LED. Then, the image sensor outputs the stored electric charge d1 of the first color through a transmission path in synchronization with receiving a subsequent shift signal SH a21. Next, in the image input device, an LED of a second color (for example, a G color) is lighted in synchronization with receiving the subsequent shift signal SH a21 for the predetermined storage time T1 (A4). Similarly, as in the case of the first color, the image sensor stores electric charge in the light-receiving element during the lighting period of the second-color LED and outputs the stored electric charge d2 of the second color through the transmission path in synchronization with receiving a subsequent shift signal SH a22. Next, in the image input device, an LED of a third color (for example, a B color) is lighted in synchronization with receiving the subsequent shift signal SH a22 for the predetermined storage time T1 (A5). The image sensor stores electric charge in the light-receiving element during the lighting period of the third-color LED. Thereafter, the image sensor outputs the stored electric charge d3 of the third color through the transmission path in synchronization with a shift signal SH a200 that is output in synchronization with receiving an edge signal corresponding to a subsequent line. With these operations, data corresponding to one line is read out.

However, the image input device disclosed in JP-A-11-055471 or the motor-driven carriage-type image input device has the following problems.

When the data corresponding to each line are sequentially read in accordance with the signal from the encoder, the last color in one line may have a relatively greater output noise level than those of the remaining two colors. Specifically, the speed of the sub-scanning operation may not be maintained at a constant value in the case of the hand-held type image input device disclosed in JP-A-11-055471. In the case of the motor-driven carriage-type image input device, the speed of the sub-scanning operation may vary with the speed of the motor. Therefore, there may be an increase in the period (T10 in FIG. 4) between the time of extinguishing the third-color LED and the time of receiving the signal from the encoder. Moreover, the image sensor may receive noise such as light or heat from the outside even after the extinguishing of the LED, so that electric charge resulting from the noise are stored in the image sensor. As the period between the time of extinguishing the third-color LED and the time of receiving the signal from the encoder increases, the amount of stored electric charge corresponding to the third-color LED increases compared with those of the remaining two colors. As a result, there is an increase in the output noise level of the last color in the image sensor (for example, "d3" in FIG. 4, corresponding to a blue color's output noise), which thereby deteriorates the quality of the images.

SUMMARY

An advantage of some aspects of the invention is that it provides an image input device having an image sensor, capable of improving the quality of the read images.

According to a first aspect of the invention, there is provided an image input device in which a carriage mounted with an image sensor and three types of light source is moved in a sub-scanning direction of a document by a motor and the document is read in a line sequential manner.

The image input device includes a controller controlling a driving of the motor, an operation of the image sensor, and lighting and extinguishing operations of the three types of light source; and a detecting unit outputting an edge signal to the controller when detecting a movement of the carriage corresponding to one sub-scanning line. The controller is configured to sequentially light and extinguish the three types of light source whenever receiving the edge signal from the detecting unit so as to sequentially read out electric charge stored in the image sensor during the lighting period of the respective light source; and discarding the electric charge stored in the image sensor during an intervening period before receiving a subsequent edge signal.

The three types of light source may be LEDs of R, G, and B colors.

The detecting unit may be an encoder that detects a predetermined rotation of the motor.

According to the first aspect of the invention, when reading data corresponding to one line, it is configured to read out the electric charge stored in the image sensor during the lighting period of the three types of light source and then discard the electric charge stored in the image sensor during an intervening period before receiving the subsequent edge signal. Therefore, even when the time for shifting to a subsequent line is increased due to the variation in the speed of the motor, it is possible to prevent noisy electric charge from being included in the electric charge corresponding to the last-lighted light source. Accordingly, it is possible to improve the quality of images read by the image input device.

According to a second aspect of the invention, there is provided an image input method performed by an image input device in which a carriage mounted with an image sensor and three types of light source is moved in a sub-scanning direction of a document by a motor and the document is read in a line sequential manner. The image input device is provided with a detecting unit outputting an edge signal to a controller when detecting a movement of the carriage corresponding to one sub-scanning line.

The image input device performs operations including sequentially lighting and extinguishing the three types of light source whenever receiving the edge signal from the detecting unit so as to sequentially read out electric charge stored in the image sensor during the lighting period of the respective light source; and discarding the electric charge stored in the image sensor during an intervening period between the time of reading out the electric charge stored in the image sensor during the lighting period of the last one of the three types of light source and the time of receiving a subsequent edge signal.

Similarly, as in the case of the first aspect, according to the second aspect of the invention, it is configured to read out the electric charge stored in the image sensor during the lighting period of the three types of light source and then discard the electric charge stored in the image sensor during an intervening period before receiving the subsequent edge signal. Accordingly, it is possible to achieve the same advantage as in the case of the first aspect.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Hereinafter, an embodiment of the invention will be described with reference to the accompanying drawings.

First, a schematic arrangement of an image input device in accordance with an embodiment of the invention will be described with reference to FIG. 1.

Figure 1:
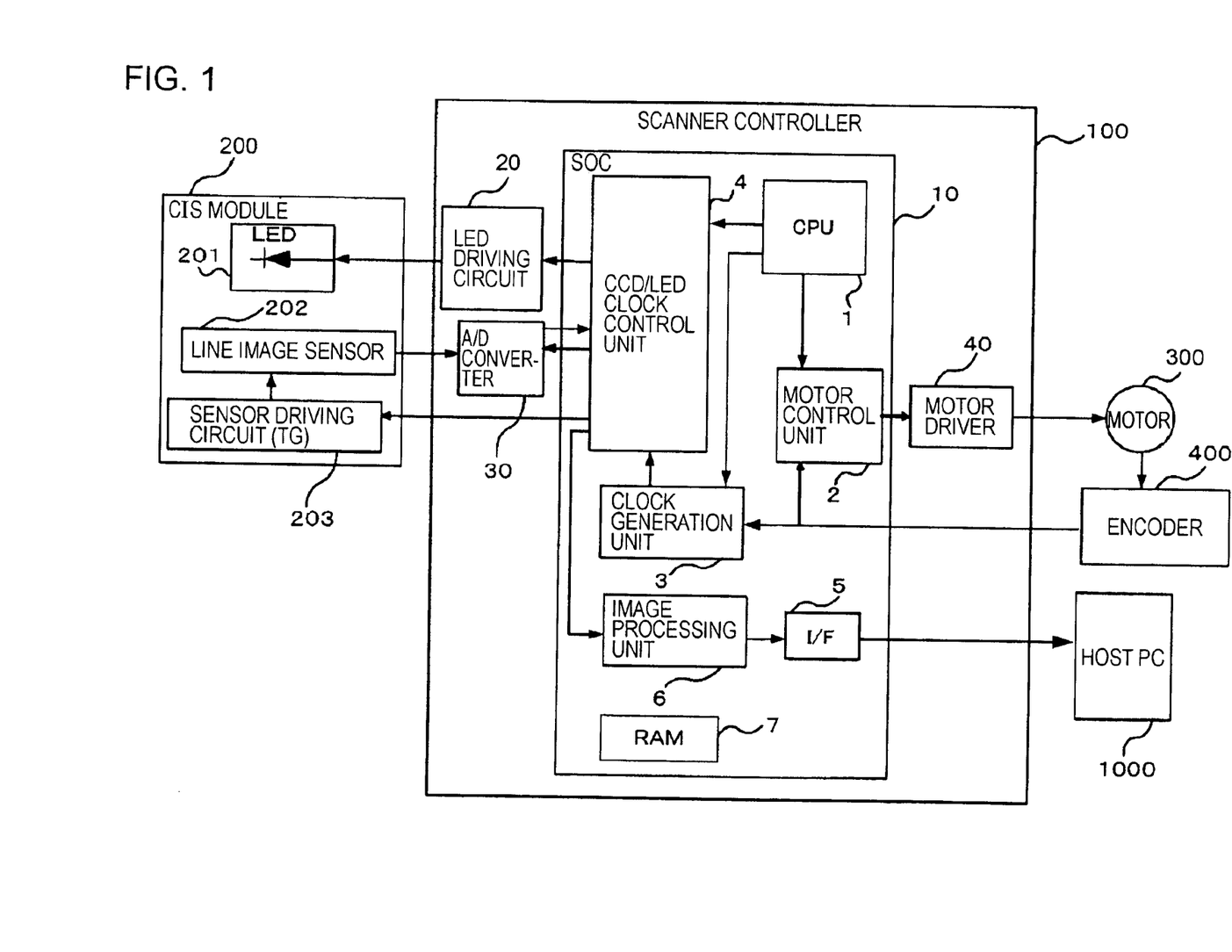
FIG. 1 is a schematic diagram showing the arrangement of an image input device in accordance with an embodiment of the invention.

FIG. 1 is a schematic diagram showing the arrangement of an image input device according to embodiments of the invention.

The image input device (not shown) is a scanner device that reads a document such as a text document or a photo placed on a document plate (not shown) and uses the read document as image information. Specifically, the image input device includes a scanner controller 100 controlling the entire operation of the device, a CIS (contact image sensor) module 200 mounted on a carriage (not shown), a motor 300 driving the carriage in a sub-scanning direction of the document, and an encoder 400. The image input device is connectable to an external device such as a host PC 1000.

The scanner controller 100 controls the operations of the CIS module 200 and the motor 300, reads the document placed on the document plate (not shown) as the image information, and outputs the image information to the external device such as the host PC 1000.

The CIS module 200 irradiates light beams onto the document placed on the document plate, receives the light beams reflected from the document, photoelectrically converts the received light beams into an electric signal, and then outputs the electric signal to the scanner controller 100.

The motor 300 drives the carriage mounted with the CIS module 200. Specifically, the motor 300 transports the carriage to reciprocate in the sub-scanning direction of the document placed on the document plate in accordance with instructions from the scanner controller 100. In the present embodiment, it is assumed that a DC motor is used as the motor 300.

The encoder 400 is connected to the motor 300 and detects the movement amount of the carriage. Specifically, the encoder 300 is a sensor that generates a sensor signal (an edge signal) in accordance with the rotation of the motor 300. The encoder 400 outputs the edge signal to the scanner controller 100 whenever the carriage is moved by an amount corresponding to one sub-scanning line of the document. That is, the encoder 300 outputs the edge signal to the scanner controller 100 whenever detecting the rotation of the motor 300 corresponding to the movement of the carriage by one sub-scanning line.

Next, the internal arrangement of the scanner controller 100 will be described.

The scanner controller 100 includes an SOC (system on chip) 10 that is an ASIC with a built-in CPU, an LED driving circuit 20 that controls lighting and extinguishing of respective LEDs in an LED portion 201 of the CIS module 200, an A/D converter 30, and a motor driver 40 that controls the driving of the motor 300.

The SOC 10 controls the operation of the LED portion 201 of the CIS module 200 and the driving of the motor 300. The SOC 10 outputs image data read from the document to the host PC 1000.

Specifically, the SOC 10 includes a CPU (central processing unit) 1 that executes various programs, a motor control unit 2, a clock generation unit 3, a CCD/LED clock control unit 4, an interface 5 that controls transmission and reception of data to and from an external device (for example, the host PC 1000), an image processing unit 6, and a RAM 7 that stores various types of data and programs therein.

The CPU 1 loads a program stored in an auxiliary storage unit (not shown) to the RAM 7 and executes the program, thereby controlling operations of each element of the SOC 10.

The motor control unit 2 receives instructions from the CPU 1 and controls the driving of the motor 300 through the motor driver 40.

Upon receiving the edge signal from the encoder 400, the clock generation unit 3 generates a signal (a timing pulse signal) for instructing the CIS module 200 to start an operation of reading data corresponding to one horizontal line of the document. Then, the clock generation unit 3 outputs the generated "timing pulse signal" to the CCD/LED clock control unit 4.

Upon receiving the "timing pulse signal" from the clock generation unit 3, the CCD/LED clock control unit 4 controls the CIS module 200 to read the data corresponding to the one horizontal line. Specifically, upon receiving the "timing pulse signal," the CCD/LED clock control unit 4 controls an operation of the LED portion 201 mounted on the CIS module 200 through the LED driving circuit 20. Upon receiving the "timing pulse signal," the CCD/LED clock generation unit 4 controls an operation of a line image sensor 202 through a sensor driving circuit (TG) 203 mounted on the CIS module 200. The CCD/LED clock control unit 4 receives an electric signal (image information) from the line image sensor 202 through the A/D converter 30 and outputs a quantized version of the image signal to the image processing unit 6.

The A/D converter 30 performs operations such as a CDS (correlated double sampling) process, an optical black clamping process for reproducing a black level of an image, an electric signal level adjusting process for adjusting a gain of the electric image signal, or a quantization process, to the electric signal (image information) read by the CIS module 200. The image processing unit 6 performs image processing such as gamma correction or shading correction, to the quantized version of the image information and outputs the processed image information to the external device such as the host PC 1000 via the interface 5.

Next, the arrangement of the CIS module 200 will be described.

The CIS module 200 includes the LED portion 201 having three LEDs corresponding to each color of R, G, and B, the line image sensor 202, and the sensor driving circuit TG 203 that controls the driving of the line image sensor 202.

The LED portions 201 sequentially lights and extinguishes the three LEDs of the R, G, and B colors in accordance with instructions from the LED driving circuit 20. Specifically, the LED portion 201 lights the R color LED so as to irradiate the document and then extinguishes the R color LED after a predetermined storage time T1. Next, the LED portion 201 lights the G color LED so as to irradiate the document and then extinguishes the G color LED after the predetermined storage time T1. Subsequently, the LED portion 201 lights the B color LED so as to irradiate the document and then extinguishes the B color LED after the predetermined storage time T1.

The sensor driving circuit 203 outputs a control signal (a shift signal SH) for controlling the operation of the line image sensor 202 to the line image sensor 202 in accordance with instructions from the CCD/LED clock control unit 4 of the scanner controller 100.

The line image sensor 202 receives the light beams that are irradiated onto the document from the LED portion 201 and then reflected from the document. The line image sensor 202 stores therein electric charge obtained by photoelectrically converting the received light beams and reads out the stored electric charge therefrom. Specifically, the line image sensor 202 sequentially reads out the electric charge stored therein during the lighting of the respective LEDs in synchronization with the shift signal SH from the sensor driving circuit 203 and then outputs the electric charge as an analog electric signal to the scanner controller 100.

In the invention, the arrangement of the line image sensor 202 is not particularly limited to a specific arrangement. In the following descriptions, it is assumed that the line image sensor 202 includes a plurality of light receiving elements (photodiodes) arranged in one line, a CCD analog shift register for maintaining and transferring electric charge stored in the light receiving elements (photodiodes), a shift gate for shifting the electric charge stored in the light receiving elements (photodiodes) to the CCD analog shift register, and an output unit that outputs the electric charge maintained by the CCD analog shift register to the A/D converter 30.

Next, internal signal flows performed by the image input device when reading a document placed on a document plate will be described with reference to FIG. 2.

Figure 2:
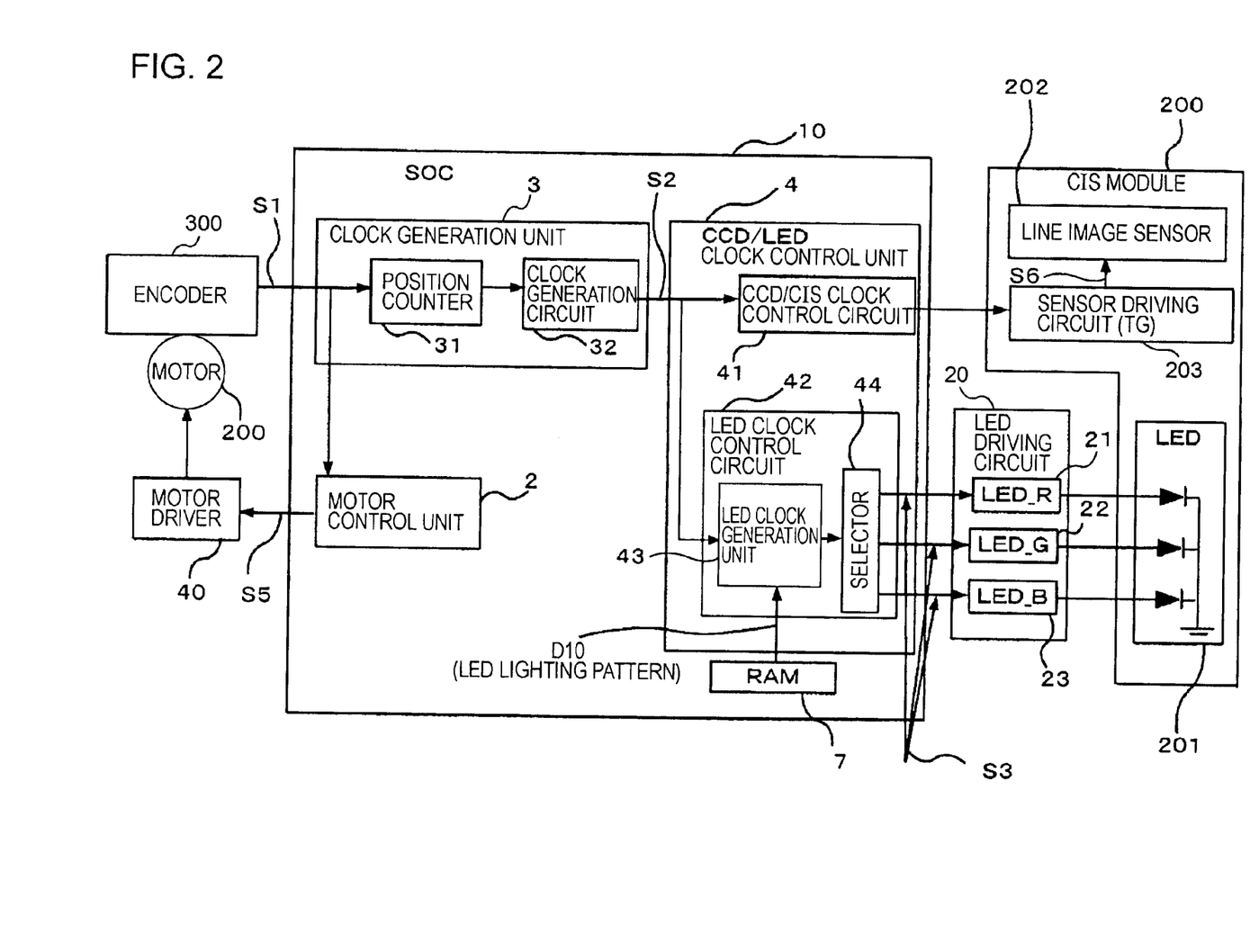
FIG. 2 is a diagram for explaining internal signal flows in the image input device in accordance with the present embodiment.

FIG. 2 is a diagram for explaining the internal signal flows in the image input device according to the present embodiment. To simplify the explanations, the CPU 1, interface 5, and image processing circuit 6 constituting the scanner controller 100 shown in FIG. 1 are not depicted in FIG. 2.

In the image input device, upon receiving a document read request from a user, the CPU 1 (not shown in FIG. 2) controls the motor control unit 2 to drive the motor 300. After the driving of the motor 300 is started, the encoder 400 outputs an edge signal S1 upon detecting that a carriage (not shown) is moved to a read start position at which the reading of the document is started. Thereafter, the encoder 400 outputs the edge signal S1 whenever a movement of the carriage (not shown) corresponding to one sub-scanning line is detected.

The edge signal S1 output from the encoder 400 is provided to the motor control unit 2 and the clock generation unit 3.

The motor control unit 2 controls the driving of the motor 300 using the edge signal S1 so that a feedback control of the motor 300 is performed therebetween. Specifically, the motor control unit 2 generates a signal (a motor driver driving signal) for controlling the operation of the motor 200 using the received edge signal and outputs the motor driver driving signal S5 to the motor driver 40. The motor driver 40 controls the driving of the motor 200 in accordance with the motor driver driving signal S5. The feedback control of the motor 200 using the edge signal from the encoder 300 is based on existing technology.

Next, the operation of the clock generation unit 2 after receiving the edge signal S1 will be described. The clock generation unit 3 includes a position counter 31 and a clock generation circuit 32. The position counter 31 is a counter for determining the position of the carriage and starts its counting whenever receiving the edge signal S1. The clock generation circuit 32 generates a signal (a timing pulse) for instructing the CIS module 200 to start an operation of reading data corresponding to one horizontal line in synchronization with the counting of the position counter 31. The clock generation circuit 32 outputs the generated timing pulse S2 to the CCD/LED clock control unit 4. That is, upon receiving the edge signal S1 from the encoder 300, the clock generation unit 3 generates the timing pulse S2 and outputs the timing pulse S2 to the CCD/LED clock control unit 4.

Next, the operation of the CCD/LED clock control unit 4 after receiving the timing pulse S2 will be described. The CCD/LED clock control unit 4 includes a CCD/CIS clock control circuit 41 and an LED clock control circuit 42. The timing pulse S2 is provided to the CCD/CIS clock control circuit 41 and the LED clock control circuit 42.

Upon receiving the timing pulse S2, the CCD/CIS clock control circuit 41 generates a signal (a sensor driving timing pulse) for controlling the operation of the line image sensor 202. The CCD/CIS clock control circuit 41 outputs the sensor driving timing pulse S4 to the sensor driving circuit 203 of the CIS module 200. As will be described later, upon receiving the sensor driving timing pulse S4, the sensor driving circuit 203 outputs a signal (a shift signal SH) for instructing the line image sensor 202 to start an operation of reading electric charge.

Specifically, upon receiving the timing pulse S2, the CCD/CIS clock control circuit 41 generates and outputs the sensor driving timing pulse (for a first color) for instructing to start an operation of storing electric charge during the lighting of the first-color LED among the three color LEDs. Next, the CCD/CIS clock control circuit 41 counts a predetermined period t1 using a timer (not shown) after outputting the sensor driving timing pulse for the first color. After counting the predetermined period t1 using the counter, the CCD/CIS clock control circuit 41 generates and outputs the sensor driving timing pulse (for a second color) for instructing to start the operation of storing electric charge during the lighting of the second-color LED among the three color LEDs.

Next, the CCD/CIS clock control circuit 41 counts the predetermined period t1 using the timer (not shown) after outputting the sensor driving timing pulse for the second color. After counting the predetermined period t1 using the counter, the CCD/CIS clock control circuit 41 generates and outputs the sensor driving timing pulse (for a third color) for instructing to start the operation of storing electric charge during the lighting of the third-color LED among the three color LEDs.

Next, the CCD/CIS clock control circuit 41 counts the predetermined period t1 using the timer (not shown) after outputting the sensor driving timing pulse for the third color. After counting the predetermined period t1 using the counter, the CCD/CIS clock control circuit 41 generates and outputs the sensor driving timing pulse (for a read and discard purpose) for instructing to start the operation of storing electric charge for the read and discard purpose.

Alternatively, the CCD/CIS clock control circuit 41 may receive the timing pulse S2 from the clock generation unit 3 during an intervening period between the time of outputting the sensor driving timing pulse S4 for the third color and the end of the predetermined period t1. In this case, the CCD/CIS clock control circuit 41 generates the sensor driving timing pulse S4 for instructing to start an operation of reading out data of a subsequent line, rather than generating the sensor driving timing pulse S4 for the read and discard purpose.

Next, the operation of the sensor driving circuit 203 after receiving the sensor driving timing pulse will be described. Upon receiving the sensor driving timing pulse, the sensor driving circuit 203 outputs the shift signal SH to the line image sensor 202.

Upon receiving the shift signal SH, the line image sensor 202 opens its shift gate so as to shift the electric charge stored in its light receiving elements (photodiodes) to its CCD analog shift register. When the electric charge is transferred to the CCD analog shift register, the line image sensor 202 outputs the electric charge as an electric signal to the A/D converter 30. When the entire electric charge stored in the light receiving elements (photodiodes) are shifted to the CCD analog shift register, the line image sensor 202 closes the shift gate so as to start the operation of storing the electric charge newly supplied to the light receiving elements.

In the line image sensor 202, the electric charge stored after receiving the shift signal SH (for the read and discard purpose) generated in response to the sensor driving timing pulse for the read and discard purpose are transferred to the CCD analog shift register at the time of receiving a subsequent shift signal SH (at the time of receiving the shift signal SH for instructing to start the operation of reading the electric charge during the lighting of the first-color LED in a subsequent line), and the electric charge is discarded in the CCD analog shift register. For example, by allowing an output unit of the line image sensor 202 to determine the amount of outputting data corresponding to each color in each line, it is possible to discard the electric charge transferred from the CCD analog shift register in the fourth data output operation after reading out data corresponding to one line. The operation of the line image sensor 202 reading out the electric charge will be described in detail with reference to FIG. 3.

Next, the operation of the LED clock control circuit 42 after receiving the timing pulse S2 will be described. The LED clock control circuit 42 includes an LED clock generation unit 43 generating an LED lighting timing pulse and a selector 44. The selector 44 is connected to the LED driving circuit 20. The LED driving circuit 20 includes an LEDR driving circuit 21 for driving the R color LED, an LEDG driving circuit 22 for driving the G color LED, and an LEDB driving circuit 23 for driving the B color LED.

The LED clock generation unit 43 receives the timing pulse S2 from the clock generation unit 3. The LED clock generation unit 43 reads out an LED lighting pattern D10 stored in a predetermined area of the RAM 7 and generates a signal for controlling the lighting and extinguishing of the LED in accordance with the LED lighting pattern D10. Here, it is assumed that the LED lighting pattern D10 includes the order of lighting the three color LEDs in the CIS module 200. In the present embodiment, it is assumed that the order of lighting the three color LEDs are in the order of R, G, and B.

Upon receiving the timing pulse S2 from the clock generation unit 3, the LED clock generation unit 43 generates an LED lighting timing pulse S3 and outputs the generated LED lighting timing pulse S3 to the LEDR driving circuit 21 via the selector 44. Specifically, the LED clock generation unit 43 instructs the selector 44 to select the R color and outputs the LED lighting timing pulse S3, in accordance with the LED lighting pattern. Then, the selector 44 outputs the LED lighting timing pulse S3 to the LEDR driving circuit 21.

Upon receiving the LED lighting timing pulse, the LEDR driving circuit 21 lights the R color LED in the LED portion 201 of the CIS module 200 and then extinguishes the R color LED after a predetermined storage time T1. That is, the LEDR driving circuit 21 lights the R color LED in the LED portion 201 in synchronization with the operation of the CCD/CIS clock control circuit 41 outputting the sensor driving timing pulse S4 for the first color.

Next, the LED clock generation unit 43 counts a predetermined period t1 using a timer (not shown) after outputting the LED lighting timing pulse S3 for instructing the selection of the R color. Here, the predetermined time t1 is the same as that used for the CCD/CIS clock control circuit 41. After counting the predetermined period t1 using the counter, the LED clock generation unit 43 generates the LED lighting timing pulse S3 for instructing the lighting of the G color LED. The LED clock generation unit 43 outputs the generated LED lighting timing pulse S3 to the LEDG driving circuit 22 via the selector 44. Specifically, the LED clock generation unit 43 instructs the selector 44 to select the G color and outputs the LED lighting timing pulse S3, in accordance with the LED lighting pattern. Then, the selector 44 outputs the LED lighting timing pulse S3 to the LEDG driving circuit 22.

Upon receiving the LED lighting timing pulse, the LEDG driving circuit 22 lights the G color LED in the LED portion 201 of the CIS module 200 and then extinguishes the G color LED after a predetermined storage time T1. That is, the LEDG driving circuit 22 lights the G color LED in the LED portion 201 in synchronization with the operation of the CCD/CIS clock control circuit 41 outputting the sensor driving timing pulse S4 for the second color.

Next, the LED clock generation unit 43 counts a predetermined period t1 using the timer after outputting the LED lighting timing pulse S3 for instructing the selection of the G color. After counting the predetermined period t1 using the counter, the LED clock generation unit 43 generates the LED lighting timing pulse S3 for instructing the lighting of the B color LED. The LED clock generation unit 43 outputs the generated LED lighting timing pulse S3 to the LEDB driving circuit 23 via the selector 44. Specifically, the LED clock generation unit 43 instructs the selector 44 to select the B color and outputs the LED lighting timing pulse S3, in accordance with the LED lighting pattern. Then, the selector 44 outputs the LED lighting timing pulse S3 to the LEDB driving circuit 23.

Upon receiving the LED lighting timing pulse, the LEDB driving circuit 23 lights the B color LED in the LED portion 201 of the CIS module 200 and then extinguishes the B color LED after a predetermined storage time T1. That is, the LEDB driving circuit 23 lights the B color LED in the LED portion 201 in synchronization with the operation of the CCD/CIS clock control circuit 41 outputting the sensor driving timing pulse S4 for the third color.

Subsequently, the operation of the CIS module 200 reading out the electric charge will be described with reference to FIG. 3.

Figure 3:
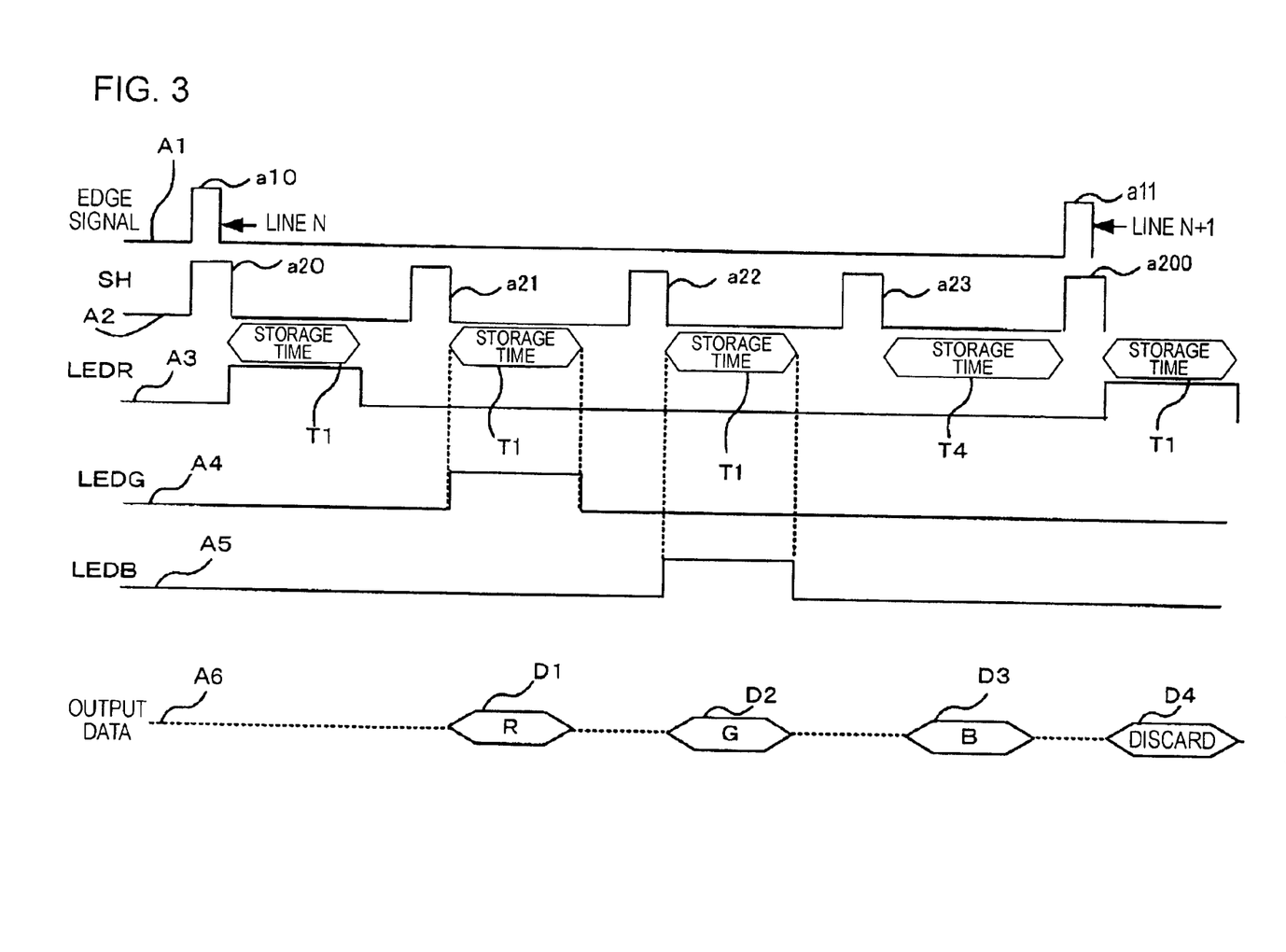
FIG. 3 is a diagram for explaining an operation of a CIS (contact image sensor) module reading out electric charge in accordance with the present embodiment.

FIG. 3 is a diagram for explaining the operation of reading out the electric charge in a CIS (contact image sensor) module in accordance with the present embodiment. In FIG. 3, reference numeral A1 denotes an output timing of the edge signal (S1 in FIG. 2) output from the encoder 400. Reference numeral A2 denotes an output timing of the shift signal SH (S6 in FIG. 2) output from the sensor driving circuit 203. Reference numeral A3 denotes timings for lighting and extinguishing the R color LED in the LED portion 201. Reference numeral A4 denotes timings for lighting and extinguishing the G color LED in the LED portion 201. Reference numeral A5 denotes timings for lighting and extinguishing the B color LED in the LED portion 201. Reference numeral A6 denotes timings for the operation of the line image sensor 202 reading out the electric charge.

When the edge signal a10 is output, the scanner controller 100 starts the operation of reading data corresponding to one line of the document. In the following descriptions, it is assumed that the first line (Line 1) of the document is read in accordance with the edge signal a10.

Specifically, when the edge signal a10 is output from the encoder 400, the scanner controller 100 outputs the sensor driving timing pulse (S4 in FIG. 2) for the first color to the sensor driving circuit 203. Upon receiving the sensor driving timing pulse (S4 in FIG. 2) for the first color, the sensor driving circuit 203 outputs the shift signal SH (a20) to the line image sensor 202. When the edge signal a10 is output from the encoder 400, the scanner controller 100 controls the LED driving circuit 20 so as to light the R color LED of the CIS module 200 and then extinguish the R color LED after the predetermined storage time T1. Upon receiving the shift signal SH (a20), the line image sensor 202 stores the electric charge in its light receiving elements during the lighting of the R color LED.

Next, the scanner controller 100 outputs the sensor driving timing pulse (S4 in FIG. 2) for the second color to the sensor driving circuit 203. Upon receiving the sensor driving timing pulse, the sensor driving circuit 203 outputs the shift signal a21 to the line image sensor 202. The scanner controller 100 lights the G color LED of the CIS module 200 and then extinguishes the G color LED after the predetermined storage time T1, in synchronization with outputting the sensor driving timing pulse for the second color. Upon receiving the shift signal SH (a21), the line image sensor 202 transfers the electric charge stored during the lighting of the R color LED to the CCD analog shift register (D1) and then stores the electric charge in the light receiving elements during the lighting of the G color LED.

Next, the scanner controller 100 outputs the sensor driving timing pulse (S4 in FIG. 2) for the third color to the sensor driving circuit 203. Upon receiving the sensor driving timing pulse, the sensor driving circuit 203 outputs the shift signal a22 to the line image sensor 202. The scanner controller 100 lights the B color LED of the CIS module 200 and then extinguishes the B color LED after the predetermined storage time T1, in synchronization with outputting the sensor driving timing pulse for the third color. Upon receiving the shift signal SH (a22), the line image sensor 202 transfers the electric charge stored during the lighting of the G color LED to the CCD analog shift register (D2) and then stores the electric charge in the light receiving elements during the lighting of the B color LED.

Next, the scanner controller 100 outputs the sensor driving timing pulse (S4 in FIG. 2) for the read and discard purpose to the sensor driving circuit 203. Upon receiving the sensor driving timing pulse for the read and discard purpose, the sensor driving circuit 203 outputs the shift signal a23 for the read and discard purpose to the line image sensor 202. Upon receiving the shift signal SH (a23) for the read and discard purpose, the line image sensor 202 transfers the electric charge stored during the lighting of the B color LED to the CCD analog shift register (D3). The scanner controller 100 outputs the shift signal SH (a23) for the read and discard purpose to the sensor driving circuit 203. In this case, the LEDs are not lighted until being instructed to start the operation of reading a subsequent line. During the intervening period before receiving the shift signal SH (a200) for the subsequent line, noisy electric charge is stored in the light receiving elements of the line image sensor 202.

Thereafter, upon receiving the subsequent edge signal (a11) from the encoder 300 (that is, when the carriage is moved to the subsequent line), the scanner controller 100 outputs the shift signal SH (a200) to the sensor driving circuit 203 so as to light the R color LED. Upon receiving the shift signal SH (a200), the line image sensor 202 transfers the electric charge D4 stored in the light receiving elements to the CCD analog shift register. In this case, the electric charge for the read and discard purpose are discarded without being used for the image formation.

As described above, according to the present embodiment, the shift signal for controlling the operation of the line image sensor 202 is configured to include the shift signal SH for the read and discard purpose. Thanks to the shift signal SH for the read and discard purpose, it is possible to maintain the period for reading data corresponding to each of the three colors at a constant period and discard the redundantly stored electric charge resulting from the variation in the speed of the motor. Therefore, in the present embodiment, as shown in FIG. 4, it is possible to prevent the output noise level d3 of the electric charge corresponding to the lastly lighted color LED from increasing to a value greater than the output noise levels d1 and d2 of the remaining colors. Accordingly, it is possible to improve the quality of images read by the image input device.

It should be understood that the invention is not limited to the above embodiments, but that various modifications can be made without departing from the scope and spirit of the invention that are read out through the whole of claims and specification. While the invention has been particularly shown and described with reference to a scanner device as an example of the image input device, the invention may be applied to a multi-function device having scanning, copying, and printing functions.

What is claimed is:

1. An image input device in which a carriage mounted with an image sensor and three types of light source is moved in a sub-scanning direction of a document by a motor and the document is read in a line sequential manner, the image input device comprising:
- a controller that controls driving of the motor, operation of the image sensor, and lighting and extinguishing operations of the light source; and
- a detector that outputs an edge signal to the controller when detecting a movement of the carriage corresponding to one sub-scanning line,
- wherein, when the controller receives the edge signal, the controller is configured to:
  - begin a first period, the first period including lighting and extinguishing of a first light source;
  - after the first period, read out electric charge stored in the image sensor during the first period, and begin a second period, the second period including lighting and extinguishing of a second light source;
  - after the second period, read out electric charge stored in the image sensor during the second period, and begin a third period, the third period including lighting and extinguishing of a third light source;
  - when the controller does not receive a subsequent edge signal during a predetermined period, read out, after the third period, electric charge stored in the image sensor during the third period, and discard the electric charge stored in the image sensor from after the third period through the predetermined period, and begin another first period; and
  - when the controller receives the subsequent edge signal during the predetermined period, terminate the third period, and begin another first period.

2. The image input device according to claim 1, wherein the three types of light source are LEDs of R, G, and B colors.

3. The image input device according to claim 1, wherein the detector is an encoder that detects a predetermined rotation of the motor.

4. An image input method performed by an image input device in which a carriage mounted with an image sensor and three types of light source is moved in a sub-scanning direction of a document by a motor and the document is read in a line sequential manner,
- wherein the image input device is provided with a detector outputting an edge signal to a controller when detecting a movement of the carriage corresponding to one sub-scanning line, and
- wherein, when the controller receives the edge signal, the image input method comprises:
  - beginning a first period, the first period including lighting and extinguishing of a first light source;
  - after the first period, reading out electric charge stored in the image sensor during the first period, and beginning a second period, the second period including lighting and extinguishing of a second light source;
  - after the second period, reading out electric charge stored in the image sensor during the second period, and beginning a third period, the third period including lighting and extinguishing of a third light source;
  - when the controller does not receive a subsequent edge signal during a predetermined period, reading out, after the third period, electric charge stored in the image sensor during the third period, and discarding the electric charge stored in the image sensor from after the third period through the predetermined period, and beginning another first period; and
  - when the controller receives the subsequent edge signal during the predetermined period, terminating the third period, and beginning another first period.

* * * * *